United States Patent [19]

Moreira

[11] Patent Number: 5,045,855
[45] Date of Patent: Sep. 3, 1991

[54] METHOD FOR EXTRACTING MOTION ERRORS OF A PLATFORM CARRYING A COHERENT IMAGING RADAR SYSTEM FROM THE RAW RADAR DATA AND DEVICE FOR EXECUTING THE METHOD

[75] Inventor: Joao Moreira, Landsberg, Fed. Rep. of Germany

[73] Assignee: Deutsche Forschungsanstalt fur Luft- und Raumfahrt e.V., Cologne, Fed. Rep. of Germany

[21] Appl. No.: 548,792

[22] Filed: Jul. 6, 1990

[30] Foreign Application Priority Data

Jul. 7, 1989 [DE] Fed. Rep. of Germany ....... 3922427

[51] Int. Cl.$^5$ .............................................. G01S 13/90
[52] U.S. Cl. ...................................................... 342/25
[58] Field of Search .......................................... 342/25

[56] References Cited

U.S. PATENT DOCUMENTS

| 4,359,732 | 11/1982 | Martin | 342/25 |
| 4,929,950 | 5/1990 | Freeman et al. | 342/25 |

FOREIGN PATENT DOCUMENTS

| WO88/10434 | 12/1988 | PCT Int'l Appl. | 342/25 |
| 2069281 | 8/1981 | United Kingdom | 342/25 |
| 2185651 | 7/1987 | United Kingdom | 342/25 |

OTHER PUBLICATIONS

Merrill I. Skolnik, "Radar Applications", pp. 321–356, 1987.
Livingstone et al., "CCRS C/X-Airborne Synthetic Aperture Radar: An R and D Tool for The ERS-1 Time Frame", pp. 15–21, 1998, IEEE 88 CH2572.

Primary Examiner—Gilberto Barron, Jr.
Attorney, Agent, or Firm—Browdy and Neimark

[57] ABSTRACT

In a method for extracting motion errors of a platform carrying a coherent imaging radar system from raw radar data, azimuth spectra continuously following each other in time are formed over a set period of time for the imaging of terrains with mainly homogeneous ground reflectivities. An estimate of the ground reflectivity part is performed with a Kalman filter and with the aid of the azimuth spectra represented and system parameters entered. Then the antenna pattern part is obtained by dividing the azimuth spectrum by the estimated ground reflectivity part. By frequency filtering a separation of the drift angle $\phi(t)$ from the velocity $V_b(t)$ in the LOS- direction of the antenna is subsequently performed and then the velocity obtained is subjected to normalization after having been integrated, from which results the displacement in the line of sight direction of the antenna.

4 Claims, 5 Drawing Sheets

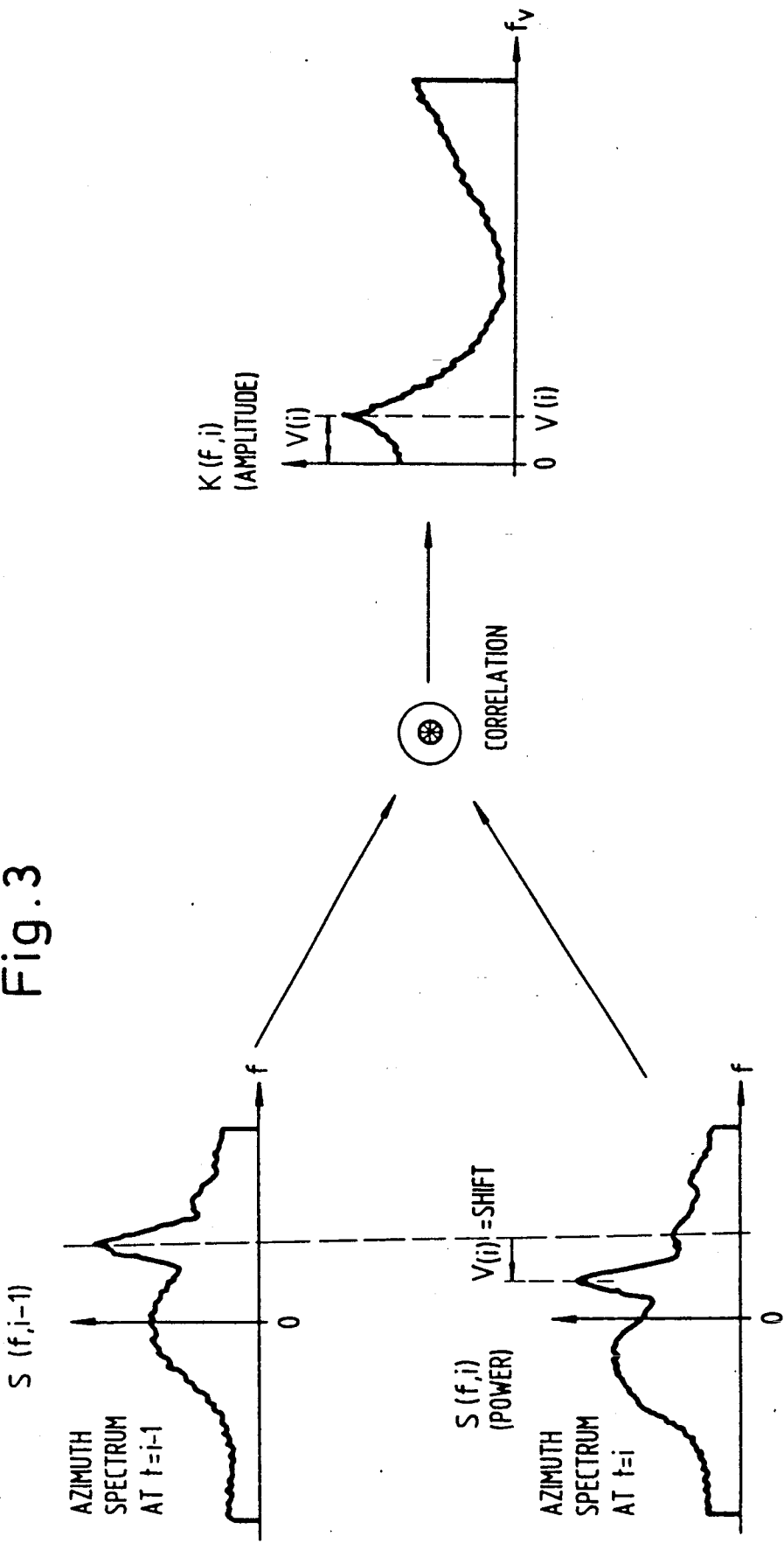

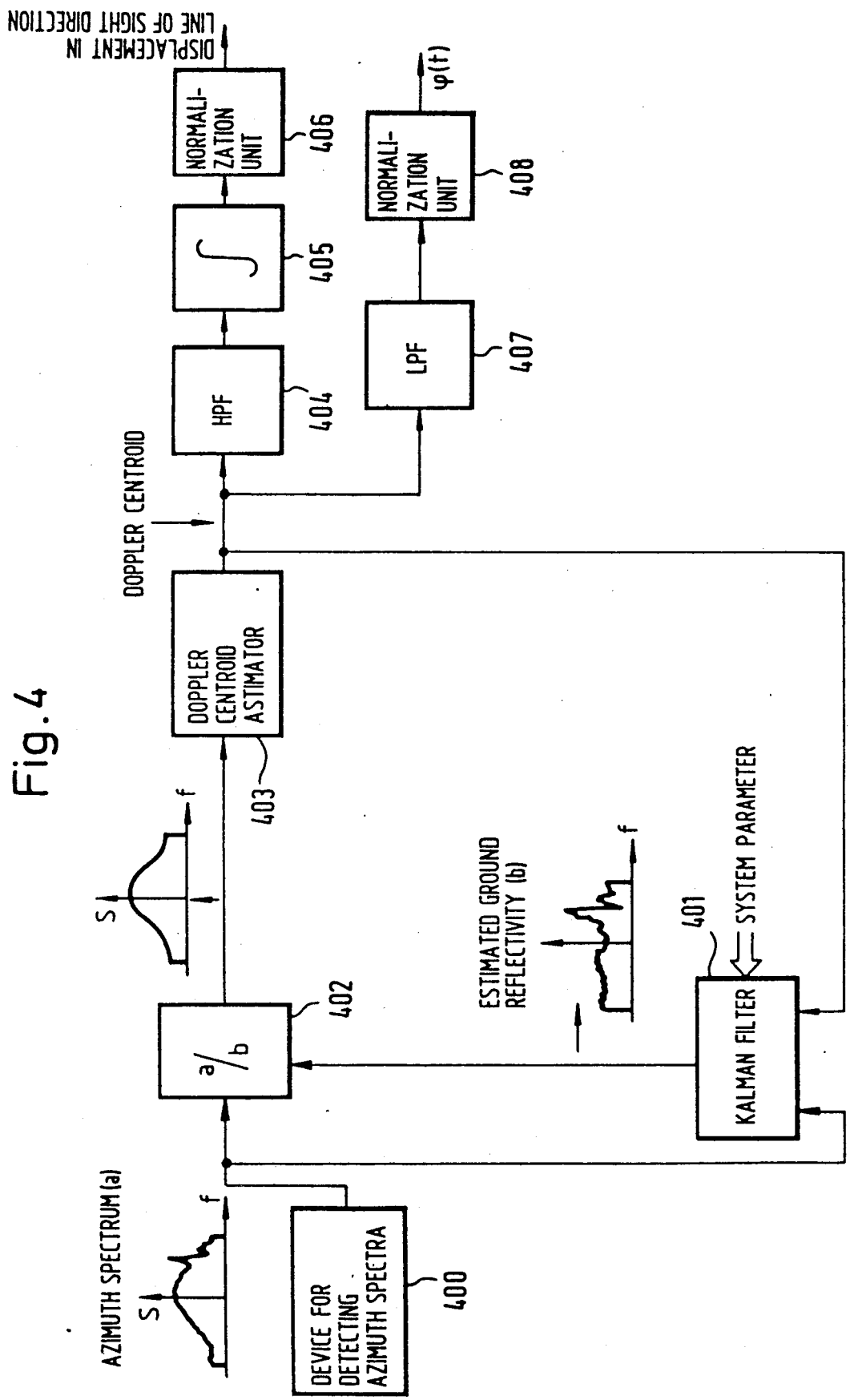

METHOD FOR EXTRACTING MOTION ERRORS OF A PLATFORM CARRYING A COHERENT IMAGING RADAR SYSTEM FROM THE RAW RADAR DATA AND DEVICE FOR EXECUTING THE METHOD

BACKGROUND OF THE INVENTION

1. Field of the Invention

The invention relates to a method for extracting motion errors of a platform carrying a coherent imaging radar system from the raw radar data and device for executing the method.

2. The Prior Art

Coherent imaging radar systems are installed on a platform, such as an aircraft, missile or helicopter or the like. Because of the conditions prevailing in connection with such platforms and because of the effects of their surroundings, such as turbulence, a platform normally cannot maintain a preset flight path. The platform deviates from the desired, set flight path, which is called a motion error. Motion errors of a magnitude of the wave length of the radar transmission signal cause distortions in coherent imaging radar systems, because of which the quality of an image is greatly reduced. The quality of an image is judged by its resolution, the contrast and the geometric distortions.

To attain high resolution, high contrast and low geometric distortions in an image, the raw data received must be corrected prior to processing or generation of the image. Such corrections can be performed in real time or off-line. Real time corrections are performed during reception of backscatter signals with the aid of digital or analog devices. After the raw data have been stored, off-line corrections are made on the ground with the aid of computer programs.

Processing or generation of an image can only be performed after a correction, which is called motion compensation. A correlation between the raw data and the expected theoretical phase history is performed for generating an image, and a high resolution two-dimensional image can only be obtained after such a correlation.

All real time motion compensation systems depend on on-board inertial navigation systems (INS) or other navigation systems, such as GPS (Global Positioning System). With some real time motion compensation systems, an additional simple Doppler analysis of the raw radar data is performed in order to estimate the angle of drift of the platform based on wind effects or because of the scanning geometry. This has been described by way of example in a publication in connection with a CCRS symposium, held in Canada in 1988, in the form of a special issue 88 CH 2572-6/88/000-015 of IEEE.

Either a processing program similar to that used with the real time systems is used with all known off-line motion compensation systems and/or an autofocus method is additionally used during generation of the image.

However, all known motion compensation systems have several disadvantages. Because of the high demands made on the motion data in respect to accuracy, band width and temporal stability, it is necessary to use inertial navigation systems which, for example, have bene specially manufactured, in connection with imaging radar systems where motion compensation is performed. However, this results in very high costs for procurement, installation and maintenance. When using motion compensation systems operating with GPS receivers, support by a ground station is absolutely necessary. However, because of this not only are the operating costs very high, but considerable restrictions in the choice of the field of operations must also be expected. But without the support of a ground station, the GPS motion data absolutely required for motion compensation are not sufficiently exact.

Although autofocus methods are not dependent on inertial navigation systems, these methods cannot be performed in real time because of the great computing demands. Furthermore, autofocus methods do not have a great band width, nor do they have high accuracy, so that motion errors caused in particular by wind gusts cannot be corrected. For this reason, autofocus methods are normally only used to estimate the forward motion of a platform.

BRIEF DESCRIPTION OF THE INVENTION

It is therefore the object of the invention to improve the picture quality of the images by means of a method for the extraction of motion errors of a platform carrying a coherent imaging radar system from the raw radar data as well as by means of a device for executing this method without having to resort to a navigation system, such as INS.

A prerequisite for this is that the motion data regarding a platform carrying the imaging radar system are determined very exactly so that the raw data thus obtained can be appropriately corrected. For this, the following movements of the platform must be determined, namely its forward velocity, the displacement in LOS, i.e. the displacement in Line Of Sight direction of the antenna, as well as the drift angle of the platform. In accordance with the invention, separation and evaluation of two parts of an azimuth spectrum will be performed for extracting motion errors, namely either the separation and evaluation of what will be called hereinafter an antenna pattern part or of what will be called hereinafter a ground reflectivity part. In what follows, only the evaluation of the antenna pattern part or its doppler centroid will be described and treated, this method will therefore be called the (spectrum) centroid method for simplicity's sake.

In contrast to the GPS systems previously mentioned, it is particularly advantageous in the motion extraction method according to the invention that all information required for motion compensation is taken from the raw radar data. In contrast to the GPS systems, there is no need for a ground station, so that the method of the invention can be used much more flexibly and is more self-sufficient.

In comparison with the autofocus method, the motion extraction method of the invention has a much higher band width. It is furthermore possible to determine in addition many motion errors, such as acceleration, velocity and displacement, i.e. the motion errors in line of sight direction of the antenna. All these are data which cannot be obtained by means of the autofocus method. The execution of the method of the invention is also possible in real time, which can also not be realized with the autofocus method.

The invention will be described by means of a preferred embodiment, making reference to the attached drawings.

BRIEF DESCRIPTION OF THE DRAWINGS

FIG. 2a is a schematic view of the azimuth spectrum of a range gate, FIG. 2b is a schematic course of a spectrum of antenna diagram, and FIG. 2c is a schematic course of the spectrum of the ground reflectivity;

FIG. 3 is a schematic course of an azimuth spectrum at two different points in time (t=i−1 and t=i) as well as their correlation in the method of the invention;

FIG. 4 is a block diagram of a device for executing the method, and

DETAILED DESCRIPTION OF THE PREFERRED EMBODIMENT

In the method of the invention for the extraction of motion errors, the azimuth spectrum of the raw radar data is evaluated and specially the antenna pattern part or the spectrum centroid. This method is also called the (spectrum) centroid method.

Figure 1B:
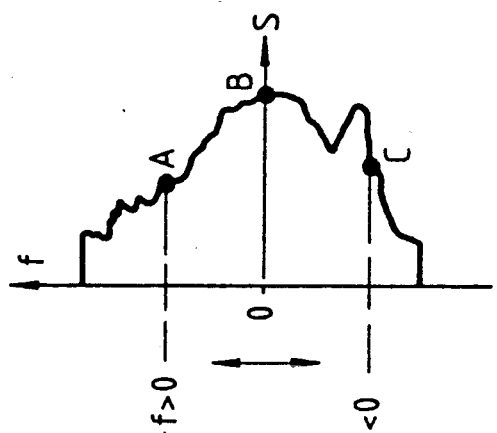
FIG. 1b is the azimuth spectrum of a range gate in the form of a diagram.
Figure 1A:
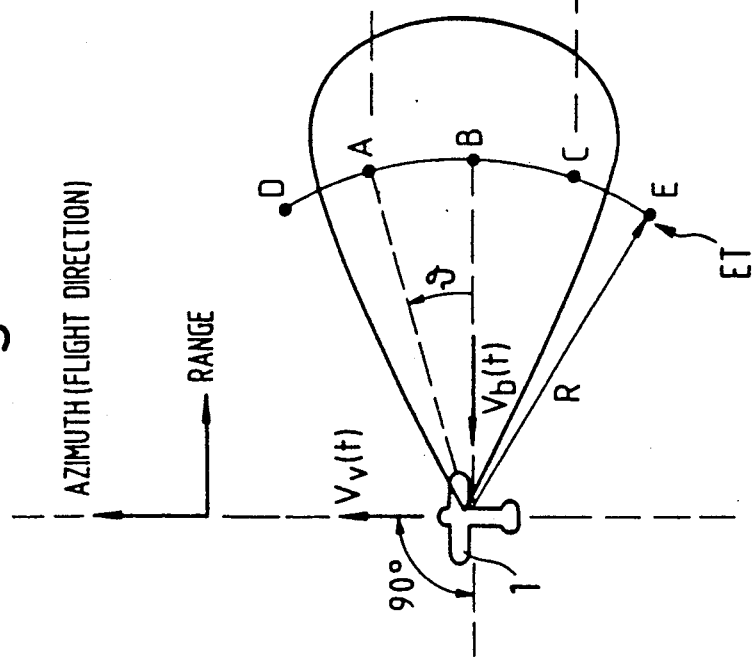
FIG. 1a is a general schematic view of the flight geometry of a radar.

Shown in FIG. 1a is an example of a common flight geometry of a radar and of the corresponding azimuth spectrum. The platform for a radar system in the form of a schematically indicated aircraft I flies at a forward velocity $V_v$ and in this way has a velocity error $V_b$ in the line of sight direction of an antenna, not shown in detail, the main lobe of which is schematically shown, where its beam angle in the present case has an approximate value of about 17°. The two velocity vectors $V_v$ and $V_b$ are dependent on the time t and are therefore indicated as $V_v(t)$ and $V_b(t)$ in the drawing and hereinbelow. A terrain to be represented is illuminated by the main lobe of a radar antenna disposed on the aircraft 1, which is directed crosswise to the direction of flight. For example, point targets A, B, C, D and E have been preset in a certain range gate Et as targets to be acquired. In FIG. 1 only the point targets A, B and C are illuminated.

Due to the velocity $V_v(t)$ and the velocity in the line of sight direction $V_b(t)$, each backscatter signal suffers a frequency or Doppler shift in accordance with the following equation (1):

$$F_{doppler} = \frac{2 \cdot V_v(t) \cdot \sin\sigma}{\lambda} + \frac{2 \cdot V_b(t) \cdot \cos\sigma}{\lambda} \quad (1)$$

where $\theta$ is the angle between the radar line of sight to the respective point target and the line perpendicularly to the aircraft path (which, in the example shown, extends through the target point B), and $\lambda$ is the wave length of the radar pulse transmitted.

A positive frequency shift is generated for the point target A with an angle $\theta > 0$ and the forward velocity $V_v(t)$, while for the point target C a negative frequency shift is generated with an angle $\theta < 0$ and a forward velocity of $V_v(t)$ No frequency shift is generated for the point target B due to the velocity $V_v(t)$ An azimuth spectrum of the range gate Et is schematically shown in FIG. 1b, the frequency f being entered on the vertical axis and the power S in respect to the three point targets A, B and C on the horizontal axis. Furthermore, it has been indicated to the left of the vertical axis that the frequency f is greater than 0 in the positive direction and less than 0 in the negative direction.

Figure 2C:
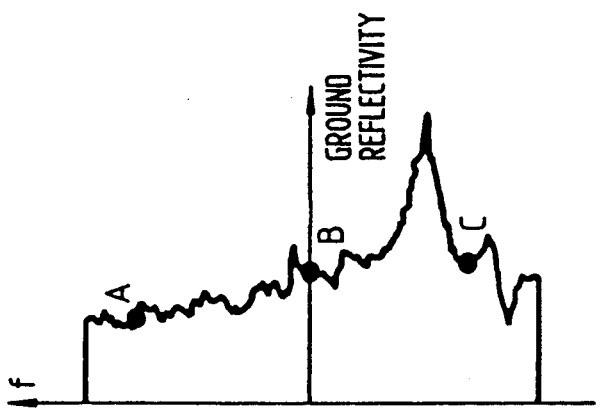
FIGS. 2a to 2c are schematic views of diagrams which, in their totality, form an azimuth spectrum, where
Figure 2B:
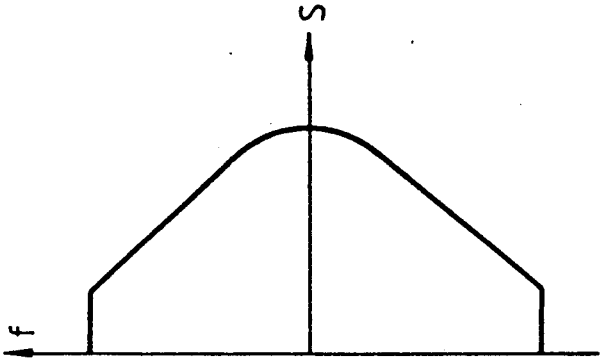
Figure 2A:
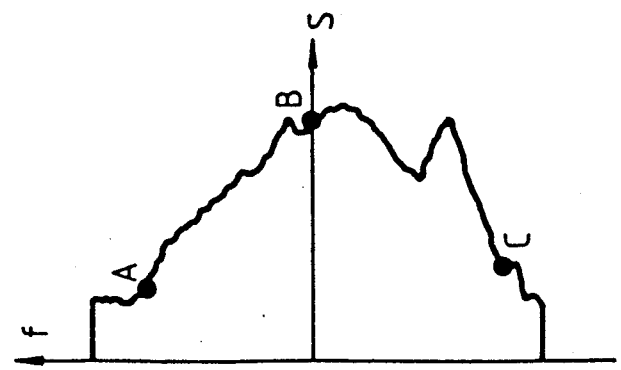

In FIGS. 2a to 2c the composition of an azimuth spectrum is given in the schematic course of graphs, the frequency f being entered in the individual drawings on the vertical axis and the power S on the horizontal axis. As can be seen from FIGS. 2b and 2c in particular, the azimuth spectrum of a range gate Et shown schematically in FIG. 2a is essentially composed of the product of the antenna pattern in the azimuth direction shown in FIG. 2b and of the ground reflectivity given by the respective target points A, B and C, for example, and shown in FIG 2c. By ground reflectivity is meant the ratio of the power of a received and a transmitted signal.

The antenna pattern part of an azimuth spectrum shown in FIG. 2b is shifted in frequency by a drift angle and the velocity in LOS direction of the antenna in accordance with equation (2) below, where the results for a frequency shift $f_a$ are:

$$f_a \approx \frac{2 \cdot V_v(t) \cdot \sin\phi(t)}{\lambda} + \frac{2 \cdot V_b(t)}{\lambda} \quad (2)$$

$\phi(t)$ being the drift angle of the platform.

The part on the ground reflectivity of the azimuth spectrum is only shifted by the velocity in the line of sight direction of the antenna in accordance with equation (3) below. The result for this frequency shift $f_r$ is:

$$f_r \approx \frac{2 \cdot V_b(t)}{\lambda} \quad (3)$$

The basic idea of the method for the extraction of the motion errors of a platform carrying a coherent imaging radar system lies in that the two parts of an azimuth spectrum shown in FIGS. 2b and 2c, namely the antenna pattern part and the ground reflectivity part are separated from each other and separately evaluated.

The accuracy of the method depends in this case on the course of the ground reflectivity or on the contrast r of the azimuth spectrum. The contrast $\tau$ of an azimuth spectrum is defined as follows:

$$\tau = \frac{\text{Standard deviation of the power of the azimuth spectrum}}{\text{Mean value of the power of the azimuth spectrum}} \quad (4)$$

If a terrain to be represented has a constant reflectivity the contrast $\tau$ of the azimuth spectrum is small, i.e. standard deviation almost equals 0, so that in this case the course of the spectrum or the shift of the ground reflectivity part cannot be exactly determined. If, however, a terrain to be represented has varied reflectivity i.e. shows a standard deviation considerably greater than 0, the contrast $\tau$ is also high and the determination of the spectrum shift is exact.

Terrains such as the sea, the desert and the like in general have a very low and constant reflectivity while terrains such as dry land with cities, meadows, mountains etc. do not have a homogenous reflectivity and thus a high contrast in the azimuth spectrum.

Therefore, in accordance with the present invention, the so-called centroid method is used in terrains with a largely homogenous reflectivity and thus low contrast, while in terrains with a high contrast τ a method can be used, which takes advantage of a method using a ground reflectivity part and which is the subject of a patent application P 39 22 428.7, filed on July 7, 1989, in the German Patent Office and called reflectivity displacement method.

In case of low contrast τ, the antenna pattern part an azimuth spectrum shown schematically in FIG. 2b must be evaluated. For this purpose, the respective ground reflectivity part is removed from the azimuth spectrum which, in contrast to FIG. 2c does not show distinct maxima in terrains with low contrast τ, for which reason the successively formed ground reflectivities are in general comparatively similar to one another. This similarity of subsequently received azimuth spectra is therefore used for estimating the ground reflectivity. As soon as it is possible to estimate the ground reflectivity the antenna pattern part can be determined by dividing each azimuth spectrum received by the estimated ground reflectivity. In this case the accuracy of the estimate becomes higher with more even reflectivity courses, i.e. with low contrast τ, because it then is possible to determine the antenna pattern part more clearly.

A block diagram of a device for the execution of the method for extraction of motion errors of a platform carrying an imaging radar system, i.e. of the so-called (spectrum) centroid method, is shown in detail in FIG. 4.

To represent a terrain with mainly homogenous ground reflectivities, this terrain is illuminated by means of the main lobe of an antenna disposed on the aircraft 1. By means of this, azimuth spectra are continuously detected over a set period of time with a device 400 for detecting azimuth spectra in a timed sequence, i.e. at different points in time i (i being a whole number value greater than 1), where this time period for taking these data is much shorter than the time required by the aircraft to fly over the terrain to be represented. Two such azimuth spectra are schematically shown as examples for the time periods t=i−1 and t =i in the left portion of FIG. 3.

The azimuth spectra with a power S(f,i), taken in a timed sequence as a function of the radar azimuth frequency f, are passed over a prediction or Kalman filter 401, where each ground reflectivity part is removed from the azimuth spectrum, as shown above block 401.

Based on the generally great similarity of such sequentially taken azimuth spectra it is possible to determine the ground reflectivity in this way. In a dividing unit 402 placed downstream of the Kalman filter 401, the azimuth spectrum a formed by means of the device 400 is divided by the estimated ground reflectivity b, which has been indicated in the block 402 by a/b. The schematically shown antenna pattern part indicated to the left of the block 403 is obtained in this manner.

In a device 403 the doppler centroid of the obtained antenna pattern part is determined, which corresponds to the frequency shift $f_d$ given in equation (2). Then the separation of the drift angle $\phi$ (t) contained in the first term of the equation (2) is achieved by means of a low-pass filter 407 downstream of the device 403, while the separation of the velocity $V_b(t)$ in the LOS direction of the range gate Et is achieved by means of a high-pass filter 404, the velocity $V_b(t)$ being contained in the second term of the equation (2).

Such a separation of the drift angle $\phi$ (t) from the velocity $V_b(t)$ in the line of sight direction of the antenna by means of a low-pass filter 407 or a high-pass filter 404 is possible, because the drift angle caused by the wind has a very low band width of 0 to 0.1 Hz, for example, while the velocity $V_b$ in the line of sight direction of the antenna has a considerably greater band width, where again only the higher frequencies are important for the motion compensation, i.e. frequencies starting with 0.2 Hz.

To determine the displacement in LOS, i.e. the motion error in the line of sight direction of the antenna, the frequency portions passed by the high-pass filter 404 are subjected to integration in an integrating unit 405 and subsequently normalized in a normalization unit 406, while the frequency portions passed by the low-pass filter 407 are normalized in a normalization unit 408. At the output of the normalization unit 406 the displacement in LOS, i.e. the motion error in the line of sight direction of the antenna, is obtained, while at the output of the normalization unit 408 the drift angle $\phi$ (t) is obtained.

The method in accordance with the invention, repeatedly also called the centroid method above, for example has the advantage over the previously cited inertial navigation system used in many cases, that the instant motion extraction method can be basically realized at considerably lower cost, and that the required computations can be performed particularly easy and quick in real time, as well as off-line, with the presently available computing systems and devices.

As already mentioned above, the method of the invention, here called the focus method, can only be successfully used if the terrain to be imaged has a homogenous ground reflectivity, i.e. a small contrast τ, such as is the case with the imaging of the sea or the ocean, a desert, or the like. It would not be possible to obtain exact results with the centroid method described above when imaging terrains not having a homogenous reflectivity i.e. a comparatively high contrast τ, which is the case when imaging terrains on dry land, i.e. imaging of the countryside, cities, meadows, mountains, and the like.

Thus, in a method utilizing a ground reflectivity part the shift between two azimuth spectra following each other in time is evaluated. Two such azimuth spectra are illustrated in FIG. 3, in the top part for the time t=i−1 and in the bottom part for the time t=i, where i is a whole number larger than 1. This time, the power S as a function of the frequency f is placed on the vertical axis. Furthermore, a shift V(i) of a maximum in relation to the azimuth spectrum in the top part of FIG. 3 is drawn in the bottom diagram.

As already described above, when using this method the terrain to be represented must have variable ground reflectivity, so that the graphs representing the ground reflectivities do not show a constant course, such as is the case in the two azimuth spectra in FIG. 3. In this case the course of a ground reflectivity always shows a negative frequency shift, because a platform 1 carrying the radar system always flies in a forward direction and therefore all scatter sources, i.e. all objects illuminated by the radar and scattering back, have a negative course of the Doppler shift.

Thus two successively taken spectra are very similar and, after appropriate development, a frequency shift derived from equations (1) and (3) with a frequency shift V (in Hz) is obtained:

$$V = \frac{2 \cdot V_v^2(t) \cdot \Delta t}{\lambda \cdot R} + \frac{2 \cdot \dot{V}_b(t) \cdot \Delta t}{\lambda} \quad (5)$$

where R is the range of the range gate from the antenna disposed on the platform 1 and $\Delta t$ the time difference between the spectra taken successively in time. As illustrated in the lower part of FIG. 3, the shift can be determined by the position of the maximum with the aid of a correlation of the two spectra, as schematically indicated in the right part of FIG. 3, and where, related to the example shown, the course of the graphs shown in the right part of the FIG. results. In this case the amplitude as a function of the shift $f_v$ and the value i entered on the horizontal axis is shown on the vertical axis.

To represent a terrain with varied ground reflectivity this terrain is illuminated by means of the main lobe of an antenna disposed on an aircraft 1. By means of this, azimuth spectra are continuously detected over a set period of time in a timed sequence, i.e. at different points in time i (i being a whole number value greater than 1). Two such azimuth spectra are schematically shown in the left part of FIG. 3 as examples for the time periods $t=i-1$ and $t=1$. Between each two azimuth spectra, taken in a timed sequence as a function of the radar azimuth frequency f with a power S (f,i), a correlation K (f,i) is formed, namely K (f,i)=S (f,i) * S (f,i−1). For evaluating the maximum of a correlation K (f,i), the frequency shift V(i) of the ground reflectivity part is determined by means of the position of a maximum, which can been seen schematically in the right part of FIG. 3 and which corresponds to the equation (5) shown above. The separation of the forward velocity $V_v(t)$ contained in the first term of equation (5), from the acceleration $\dot{V}_b(t)$ in the line of sight direction of the range gate Et contained in the second term of equation (5), is obtained by means of varied filter operations. This is possible because the forward velocity $V_v$ has a very low band width at wind gusts up to 1 m/s, which extends from 0 to 0.1 Hz, for example. In contrast thereto, the acceleration $\dot{V}_b$ in the line of sight direction of the antenna has a considerably greater band width and furthermore, only the upper frequency portions are important for motion compensation and only frequency portions starting at 0.2 Hz need to be considered, for example.

So that it is possible to determine the displacement in the line of sight direction of the antenna, that data passed during the filter operation are integrated and subsequently normalized while the frequency portions passed for determining the forward velocity only need to normalized in order to obtain the displacement in LOS, i.e. the motion errors in the line of sight (LOS) direction of the antenna, and the forward velocity, as motion data.

A specific use of the two above mentioned methods is obtained in an optimal manner, if the contrast of an azimuth spectrum is continuously evaluated and more weight is given to the method which provides the more accurate values in each case, during determination of the displacement in LOS, i.e. motion errors in the line of sight (LOS) direction.

Figure 5:
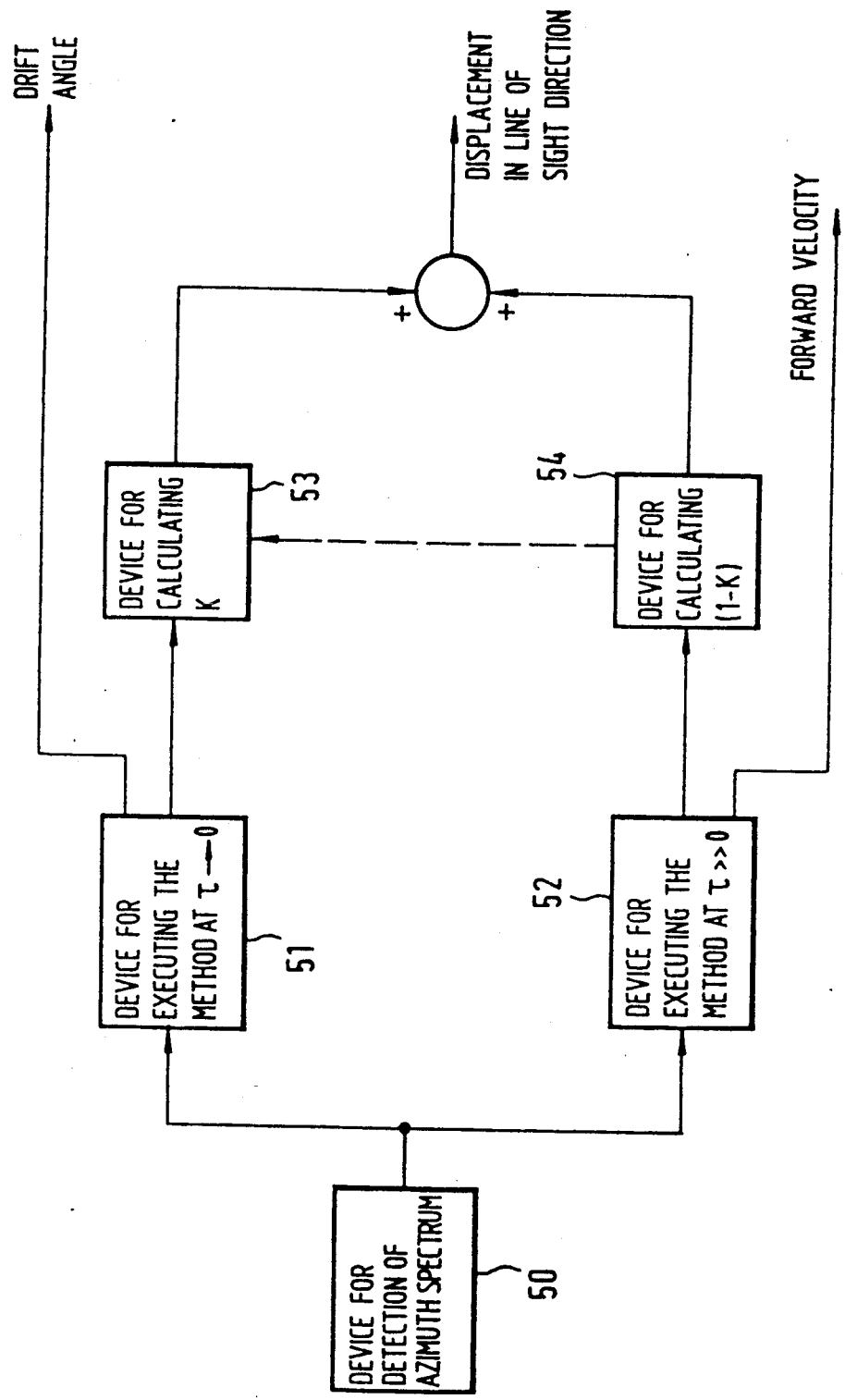
FIG. 5 is a schematic view of the linking of the method of the invention and a method for the determination of a ground reflectivity part for evaluating the practical motion extraction in relation to contrast conditions on the ground.

A block diagram for the linking of both methods is shown in FIG. 5. The azimuth spectrum of a terrain with a homogenous ground reflectivity such as the sea or the desert, will have a low contrast $\tau$, as already described in detail above, so that the most accurate results will be obtained with the so-called centroid method in accordance with the invention. In contrast thereto, however, the method utilizing the ground reflectivity part will provide the most accurate results for a terrain, such as the countryside, woods and/or cities, with varied ground reflectivities the azimuth spectrum of which has a high contrast $\tau$.

In FIG. 5, the weight of the two methods is determined by a factor k. In this case the factor k will have values between 0 and 1 in accordance with the momentary contrast $\tau$ of the azimuth spectrum. In practice this means that with low contrasts $\tau$, i.e. $\tau \to 0$, the factor k approaches 1 (i.e. $k \to 1$), while for large contrasts $\tau$, i.e. $\tau \gg 0$, the factor k approaches 0, i.e. $k \to 0$.

For the formation of the displacement in LOS, i.e. the motion errors in the LOS-direction of the antenna, in the block diagram of FIG. 5 a device 51 for executing the method at low contrast $\tau$ ($\tau \to 0$) and a device 53 for the formation of the factor k are placed downstream of a device 50 for detecting azimuth spectra, while a device 54 for forming the difference $(1-k)$ is placed downstream of a device 52 for executing the reflectivity displacement method (at a contrast $\tau \gg 0$), or of the standardization unit 45, as shown in detail in FIG. 4 of the patent application P 39 22 428.7, filed on July 07, 1989 mentioned before.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A method for the extraction of motion errors of a platform carrying a coherent imaging radar system from raw radar data, for imaging terrains with mainly homogenous ground reflectivities comprising the steps of:

forming azimuth spectra continuously successive in time over a set period of time;

estimating, using a prediction filter, a ground reflectivity part of the azimuth spectra from the formed azimuth spectra and entered system parameters as platform's forward velocity, radar range delay, and radar pulse repetition frequency;

dividing the azimuth spectrum by said estimated ground reflectivity part to obtain an antenna pattern part of the azimuth spectra;

determining a doppler centroid of the antenna pattern part;

separating the drift angle part $2 V_v(t) \sin(\phi(t)/\lambda)$ of the doppler centroid signal by low pass filtering the doppler centroid signal and a subsequent normalization using the equation arc sin (low-pass-filter-output * $\lambda/2 V_v(t)$), in order to obtain the drift angle $\phi(t)$, where $V_v(t)$ is the platform's forward velocity and $\lambda$ the wavelength of the transmitted radar signal; and separating the velocity in line of sight direction part ($2 V_b(t)/\lambda$) of the doppler centroid signal by high pass filtering the doppler centroid signal, in order to obtain the motion errors (displacement) in line of sight direction of the antenna after an integration and subsequent normalization with ($\lambda/2$).

2. A device for executing the method in accordance with claim 1, comprising an azimuth detection device (400), for the formation of azimuth spectra continuously following each other in time;

a prediction filter (401) for estimating the ground reflectivity part;

a dividing unit (402) for forming the antenna pattern part;

a device (403) for determining the doppler centroid of the antenna pattern part;

a high-pass filter (404) for determining the term ($2 V_b(t)/\lambda$), said high-pass filter being connected with the device for determining the doppler centroid of the antenna pattern part, downstream of which high-pass filter an integrating unit (405) and a normalization unit (406) have been placed for the determination of the displacement in the line of sight direction of the antenna; and a low-pass filter (407) also connected with said device for determining the doppler centroid of the antenna pattern part, downstream of which low-pass filter a normalization unit (408) for the determination of the drift angle ($\phi(t)$) is placed.

3. The method of claim 1, wherein said prediction filter is a Kalman filter.

4. The device of claim 2, wherein said prediction filter is a Kalman filter.

* * * * *